United States Patent [19]

McConnell

[11] 4,262,809
[45] Apr. 21, 1981

[54] SLOTTED BEAM AND LOADLOCK THEREFOR

[75] Inventor: Kennedy McConnell, Flossmoor, Ill.

[73] Assignee: Interlake, Inc., Oak Brook, Ill.

[21] Appl. No.: 951,183

[22] Filed: Oct. 13, 1978

[51] Int. Cl.³ .............................................. A47F 5/00
[52] U.S. Cl. .................................... 211/192; 403/317
[58] Field of Search ...................... 211/192, 191, 187; 403/318, 317, 319

[56] References Cited

U.S. PATENT DOCUMENTS

| 2,246,457 | 6/1941 | Schultz | 85/1 H |
| 2,280,084 | 4/1942 | Segal | 292/152 |
| 3,042,221 | 7/1962 | Rasmussen | 211/183 |
| 3,070,237 | 12/1962 | Fullerton et al. | 211/192 |
| 3,741,405 | 6/1973 | McConnell et al. | 211/192 |
| 3,900,111 | 8/1975 | Hiler et al. | 211/192 |

FOREIGN PATENT DOCUMENTS 917384 9/1946 France ................................. 151/41.75
240745 4/1946 Switzerland .

Primary Examiner—Roy D. Frazier
Assistant Examiner—Robert W. Gibson, Jr.
Attorney, Agent, or Firm—Vogel, Dithmar, Stotland, Stratman & Levy

[57] ABSTRACT

The loadlock and beam of the present invention are for use with a pallet rack structure in which the beam is connected to an upright of an end frame with the loadlock. The loadlock has a right angled-shaped bolt with a shank slidably extending through an aligned hole in the upright and in an end plate of the beam and has a headed handle portion extending through a contoured slot in the beam wall adjacent the end of the beam. The contoured slot defines three separate positions and cooperates with a generally cylindrical spring metal retainer positioned on the bolt handle having diametrically opposed projecting tabs engaging the innerface of the beam wall adjacent the slot and having projections engageable with the edges of the contoured slot to position the loadlock in any one of the three preselected positions. The slot and the loadlock cooperate to prevent manual movement of the lock between the shipping and locking positions, thereby preventing inadvertent disengagement of the shank from the upright and beam end plate.

18 Claims, 13 Drawing Figures

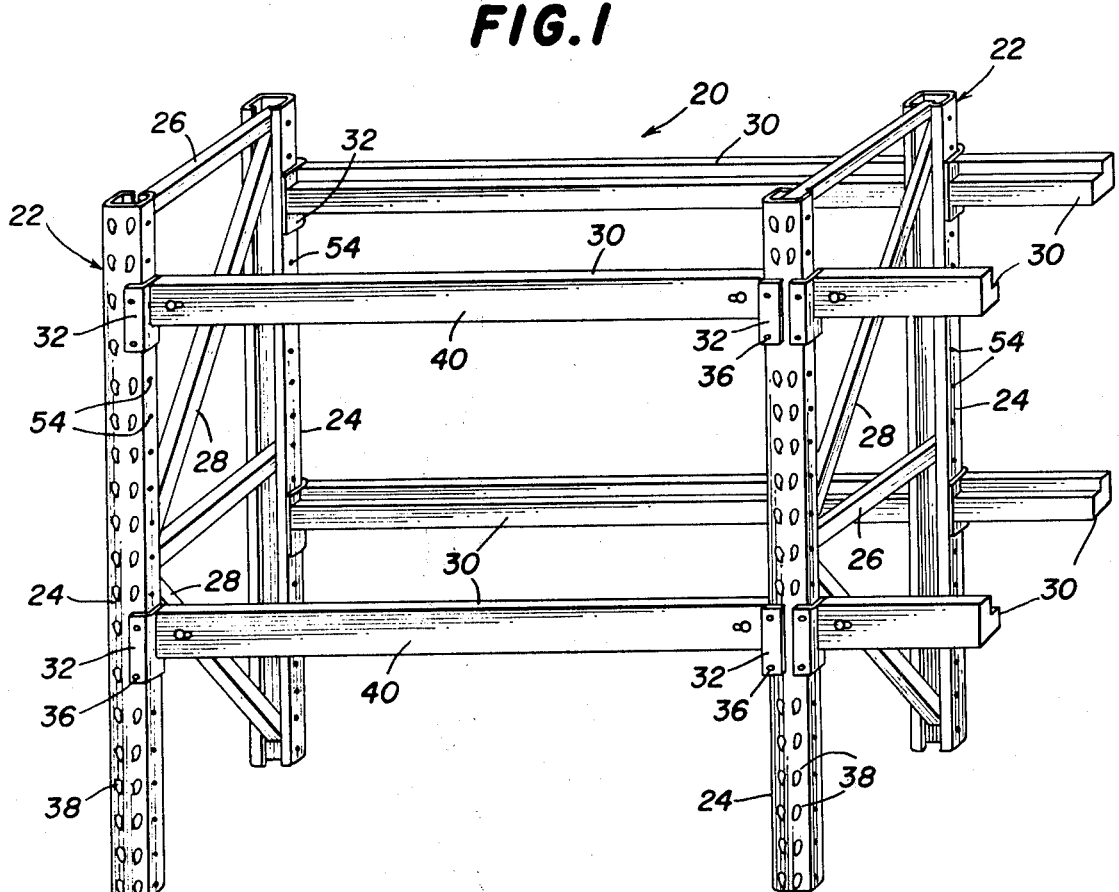
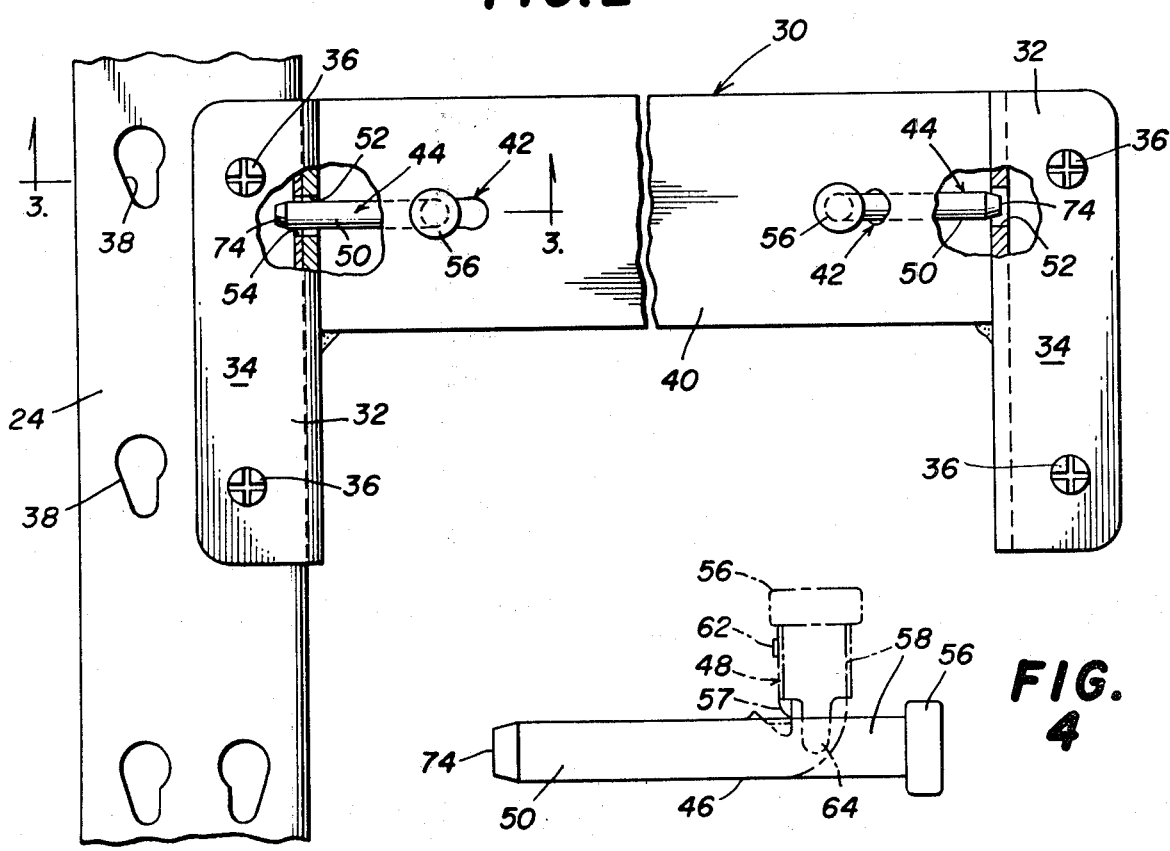

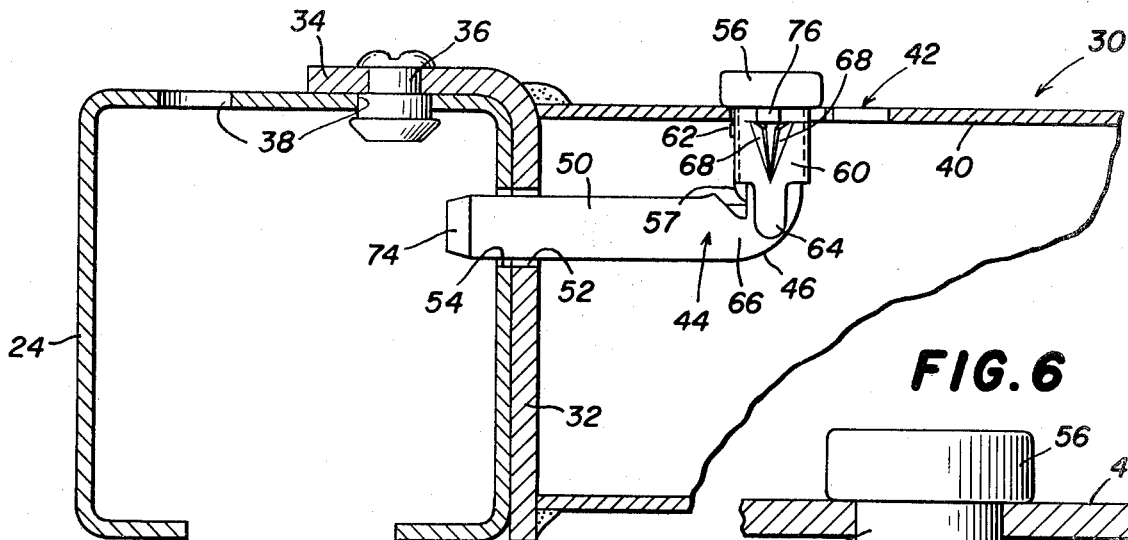
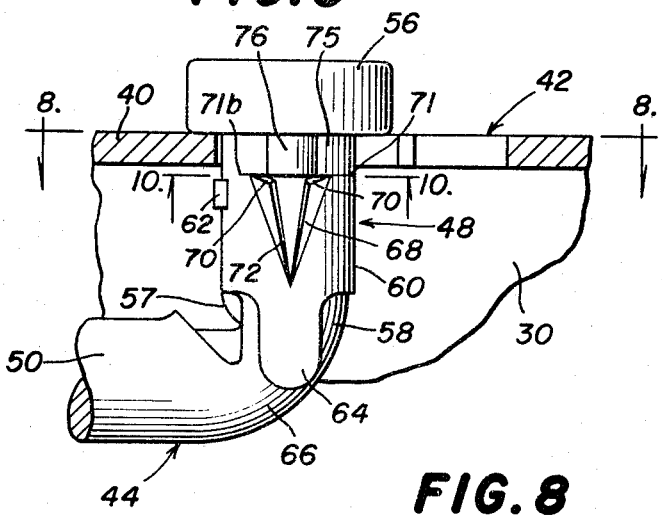
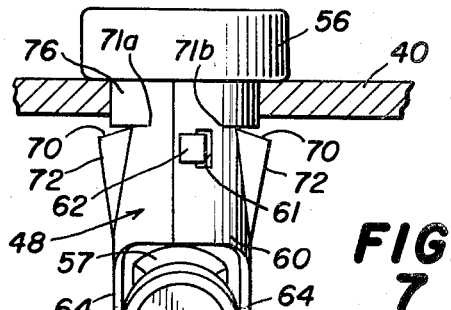
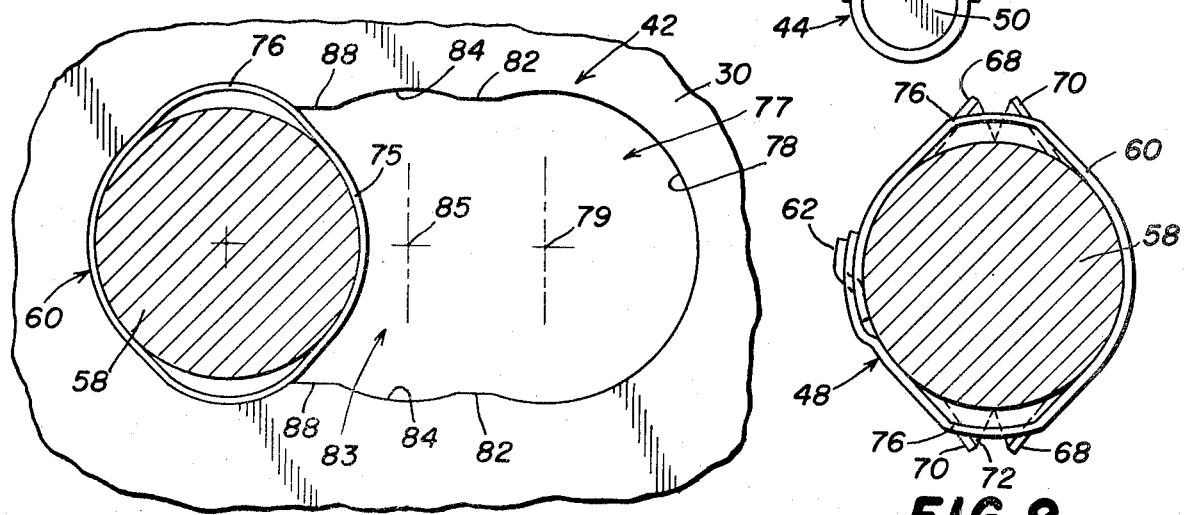

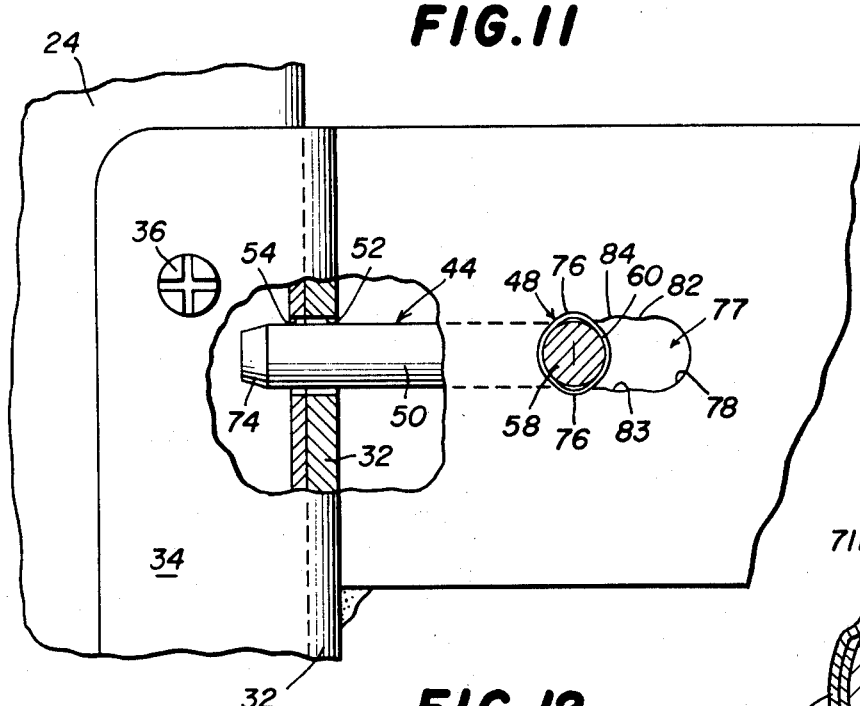
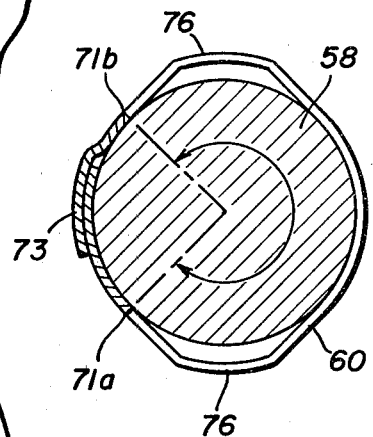
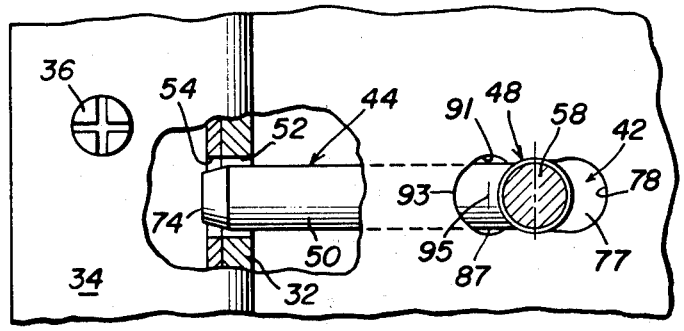
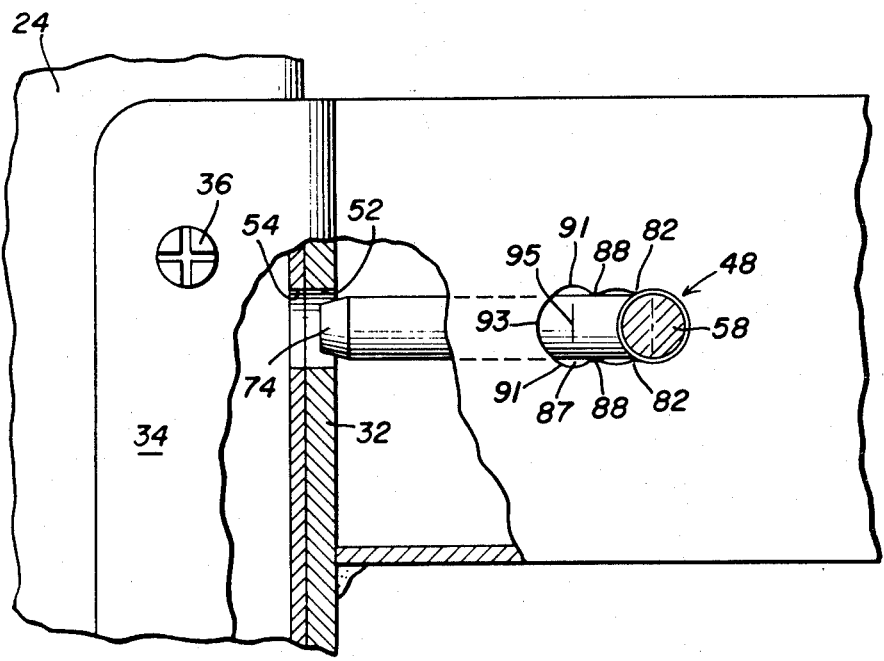

SLOTTED BEAM AND LOADLOCK THEREFOR

BACKGROUND OF THE INVENTION AND PRIOR ART STATEMENT

The present invention relates to a loadlock and beam for use in pallet racks and is an improvement in the beam and loadlock disclosed in U.S. Pat. No. 3,741,405 issued June 26, 1973 to Kennedy McConnell and Raymond F. Juechter. A typical pallet rack is disclosed in U.S. Pat. No. 3,042,221 issued July 3, 1962 to George E. Rasmussen. As disclosed in the Rasmussen patent, a pallet rack comprises at least a pair of end frames having vertical uprights connected together by horizontal and diagonal cross braces. The end frames are interconnected by beams which have lug and slanted key slot connections with the upright. Locking of the beam to the upright is provided by a loadlock which includes a sliding bolt which has a shank extending through aligned holes in the upright beam end plate and bracket welded to the innerface of the end plate and a handle extending through a contoured movement-limiting slot in the beam wall.

The handle of the loadlock bolt has an enlarged head and is fitted with a spring metal retainer which maintains the bolt in the slot and also co-acts with the contoured edge surfaces of the slot to maintain the loadlock in a selected one of three positions of the slot. In the previous McConnell et al, patent, the loadlock was manually moveable between the loading position and the locking position, only two positions being disclosed in that patent, and as a consequence the loadlock was susceptible to becoming disengaged from the upright in the field. The loadlock and slot of the present invention remedy this shortcoming by providing a three position slot having a loading position and a shipping position and a locking position wherein manual movement of the loadlock between the shipping position and the locking position is substantially eliminated.

Prior art pertinent to the present invention includes the prior identified McConnell et al, and Rasmussen patents as well as the Fullerton, et al, U.S. Pat. No. 3,070,237, the Segal U.S. Pat. No. 2,280,084 and the Swiss Pat. No. 240,745. Copies of the foregoing U.S. Patents and Swiss Patent are provided herewith along with an English language translation of the Swiss patent.

BRIEF SUMMARY OF THE INVENTION

The present invention relates to a beam having a three position slot therein and loadlock therefor, wherein the loadlock and beam of the present invention are easily connected one to the other and the loadlock cannot be unintentionally or accidentally moved from the locking position thereof.

It is an important object of the present invention to provide a beam for use in a supporting structure comprising in combination, an elongated body portion having at one end an end flange with a hole therein, a loadlock having a bolt with a shank aligned with and slidable through the end flange hole, a contoured movement-limiting slot in the body portion, the slot having the contoured edge surfaces thereof defining a loading position and a shipping position and a locking position, the shipping position being intermediate the loading position and the locking position, the opposed edge surfaces between the shipping position and the locking position being dimensioned substantially to prevent manual movement of the bolt between the positions, the handle integral with the bolt shank and extending through the contoured slot and having an enlarged head on the free end thereof, retaining means on the handle for preventing withdrawal thereof from the slot during axial sliding movement of the handle in the slot among the three positions thereof, and resilient means on the handle slidably engaging the edge surfaces of the contoured slot to retain the handle in selected one of the loading position and the shipping position and the locking position, whereby the shank end is variably positioned in the end flange hole.

Another object of the present invention is to provide an elongated beam for use in a support structure having at least a pair of end frames each having two uprights and a plurality of loadlocks for maintaining the beams connected to the associated end frame upright, the beam including a contoured movement-limiting slot in the beam, the slot having the contoured edge surfaces thereof defining a loading position and a shipping position and a locking position, the shipping position being intermediate the loading position and the locking position, opposed edge surfaces between the shipping position and the locking position being dimensioned to prevent manual movement of a loadlock between the positions.

Still another object of the present invention is to provide a loadlock for locking a slotted beam to a frame having a hole therein, comprising a bolt having a shank with an end thereof adapted to slide through the hole in the frame, a handle integral with the bolt shank and having an enlarged head on the free end thereof, retaining means on the handle for preventing withdrawal thereof from the slotted beam during axial sliding movement of the handle in the slot, and resilient means encircling the handle for slidably engaging the edge surfaces of the beam slot to retain the handle in a selected portion of the slot, the resilient means being connected to the retaining means along only a minor portion of the circumferential extent of the resilient means.

A still further object of the present invention is to provide in a support structure having at least a pair of end frames each having two uprights and a plurality of elongated beams each having a contoured movement-limiting slot therein and an end flange with a hole therein interconnecting the end frames and a plurality of loadlocks each having a bolt with a shank aligned with and slidable through the associated end flange hole and a handle extending through an associated beam slot with an enlarged head on the free end thereof for maintaining the beams connected to the end frames, the improvement comprising each of the movement-limiting slots having the contoured edge surfaces thereof defining a loading position and a shipping position and a locking position, the shipping position being intermediate the loading position and locking position, the opposed edge surfaces between the shipping position and the locking position being dimensioned to prevent manual movement of the bolt between the positions, and a one-piece resilient retainer means on each of the handles for preventing withdrawal thereof from the associated slot after insertion thereinto and for engaging the edge surfaces of the associated slot to retain the handle in a selected one of the loading position and the shipping position and the locking position.

These and other objects of the present invention may more readily be understood by reference to the following specifications taken in conjunction with the accompanying drawings, in which:

BRIEF DESCRIPTION OF THE DRAWINGS

FIG. 1 is a perspective view of a pallet rack structure utilizing the loadlock and beam of the present invention;

FIG. 2 is an enlarged elevational view, partially broken away, showing a beam mounted on a frame upright and a loadlock in the locking position and another loadlock in the loading position;

FIG. 3 is a fragmentary horizontal sectional view on an enlarged scale taken along the line 3—3 of FIG. 2, looking in the direction of the arrow;

FIG. 4 is a view showing the loadlock bolt prior to bending and illustrating the position of the retainer after bending;

FIG. 5 is a fragmentary detailed view on a further enlarged scale of the handle and retainer portion of the loadlock in a slot in the beam wall;

FIG. 6 is an elevational view on the scale on FIG. 5 taken from the right-hand side thereof showing the handle and the retainer in the beam wall slot;

FIG. 7 is an elevational view on the scale of FIG. 5 taken from the left-hand side thereof showing the handle and shank of the retainer in the beam wall slot;

FIG. 8 is a sectional view of the retainer illustrated in FIG. 5 taken along line 8—8 thereof looking in the direction of the arrows;

FIG. 9 is a sectional view of the retainer illustrated in FIG. 3 looking below the enlarged head thereof;

FIG. 10 is a sectional view of the loadlock illustrated in FIG. 5 taken along line 10—10 thereof, looking in the direction of the arrows;

FIG. 11 is an enlarged view of a beam end and upright similar to FIG. 2 illustrating the loadlock in the locking position;

FIG. 12 is an enlarged view of a beam end and upright like FIG. 2 showing the loadlock in the shipping position; and FIG. 13 is an enlarged view of the beam end and upright showing the loadlock in the loading position.

DESCRIPTION OF THE PREFERRED EMBODIMENT

FIG. 1 of the drawings illustrates a pallet rack 20 having end frames 22, each of which is formed of a pair of uprights 24 interconnected by horizontal braces 26 and diagonal braces 28, the braces being welded to the uprights 24.

The frames 22 are interconnected by pallet supporting tubular beams 30, which may be made of a pair of channel shaped bars welded together. Each beam 30 has angle shaped end plates 32 welded to the opposite open ends thereof. Flange 34 of the end plate 32 is fitted with a pair of headed lugs 36 which engage in slanted key hole shaped slots 38 in the upright 24 by means of which the end of the beam 30 is removably secured to the respective upright 24. The arrangement is such that the angled end plate 32 contacts the frame upright 24 along two faces to provide initial assurance that the beam 30 will not twist or rotate relative to the frame 22 and that when pallets are supported on the rack 20 by bridging across between the beams 30, the pallets and the loads carried thereby will be safely stored.

As seen in FIGS. 1, 2, and 3, the beam 30 has an outer wall 40 which forms the base of one of the channels of which the beam is made. Adjacent each beam end, a contoured slot 42 is formed in the outer wall, the slot shape being most clearly shown in FIGS. 8 and 11 to 13. The slot 42 receives and limits the movement of a loadlock 44.

The loadlock 44 base is a right-angle shaped bolt 46 which carries a retainer 48 made of spring metal on that portion thereof which projects through the contoured slot 42.

The bolt 46 has a shank 50 which slidably projects through a hole 52 in the end plate 32 and an aligned hole 54 in the vertical upright 24. When the shank 50 is in the locking position, shown in FIGS. 2 and 3 and extends through both of the holes 52 and 54, it is not possible to move the beam 30 with respect to the upright 24 in a direction as to disengage the lugs 36 from the key hole slots 38 nor to twist or rotate the beam relative to the upright. The loadlock 44 in locking position therefore insures that the beam 30 remains fixed to the upright and that the load carried on the beam is properly transmitted to the frame member 22.

The bolt 46 has a head 56 at the outer end of a handle portion 58 of the bolt 46 and loadlock 44 and has its underside slidable along the outer face of the beam wall 40 adjacent the contoured slot 42. The retainer 48 encircles or encloses the greater part of the handle portion 58 by a generally cylindrical body 60, see FIGS. 3 to 7. The cylindrical body 60 is formed of a generally rectangular piece of metal shaped into cylindrical form and having an opening 61 adjacent to one longitudinal edge thereof and a tab 62 extending through the opening 61 and back upon itself firmly to lock the cylindrical body 60 about the handle portion 58.

It is essential that the retainer 48 be mounted on the bolt 46 in a position that resists appreciable turning thereof on the handle portion 58. To effect this result the body 60 of the retainer is formed with a pair of diametrically opposed extensions 64 which embrace bend 66 in the bolt 46 between the shank 50 and the handle portion 58. As seen in FIG. 4 the bolt 46 initially is straight and the retainer is slipped thereover so that its end opposite the extensions 64 rest against the underside of the head 56. The bolt is bent to form the right angle bend 66 so that the handle portion 58 is normal to the shank 50 as seen by comparing the full line and dot-dash line shapes of FIG. 4. During this time, the extensions 64 lie along the outside of the bend 66 and effectively prevent rotation of the retainer 48 after the bend has been made.

The retainer 48 is also restrained against longitudinal movement with respect to the handle portion 58, such restraint being provided at one end by the head 56 and at the other end by a projection 57 formed during the right angle bending of the bolt 46 from the straight condition thereof to the right angle condition thereof as illustrated in FIG. 4. The projection 57 cooperates with the head 56 positively to position the retainer 48 on the handle portion 58 during all uses of the loadlock 44.

The retainer 48 has the dual function of assisting in holding the loadlock 44 in the contoured slot 42 in the beam wall 40 and also in adjusted longitudinal position of the shank 50. For the first function the body 60 of the retainer is formed with two pairs of diametrically opposed triangular tabs 68 which are struck out during the forming process and prior to mounting the retainer 48 on the loadlock. The tabs 68 have edges or faces 70 which are adapted to engage the inner face of the beam wall 40 adjacent the edges of the contoured slot 42. These tab faces 70 cooperate with the head 56 in preventing any significant transverse or vertical movement of the handle portion 58 within the slot 42.

The tabs 68 are formed with converging edges 72 which extend from the tips of the faces 70 to a point in the body 60. The purpose of these edges is to permit temporary deflection of the tabs 68 during the insertion of the loadlock 44 through the slot 42. The loadlock 44 is inserted into the beam 30 prior to mounting the beam on the end frame uprights 24. The shank 50 of the bolt is inserted through the contoured slot 42 and its tapered end 74 fed through the hole 52 in the end plate 32. This brings the tips of the converging edges 72 against the edges of the slot 42. In this position the bolt is driven inwardly either by striking its head 56 with a tool or with the heel of the hand so that the inner or under face of the head 56 contacts the wall 40 at which time the tab faces 70 will have cleared the edges of the slot 42 and engage the inner face of the beam wall 40, thus effectively locking the bolt 44 in the beam. The faces 70 prevent extricating the loadlock 44 from the slot 42 in reverse manner from which it was inserted, and consequently it remains secured in place and cannot ordinarily be unintentionally or accidentally lost from the beam 30.

As seen by a comparison of the two different positions of the loadlock 44 in FIG. 2; the loadlock 44 is intended to be moved lengthwise of the contoured slot 42 and to be retained in the positions selected by the assembler of the pallet rack 20. The retainer 48 is shown to be formed with a pair of diametrically opposed projections 76 which engage the edges of the slot 42 adjacent the tab faces 70 and immediately below the head 56 to hold the loadlock 44 in the selected position. As seen, the projections 76 lie on a ring 75 which is connected to the remainder of the cylindrical body 60 only between the edges 71a and 71b of the slit 71 which extends around the cylindrical body 60 approximately 270°, see FIG. 10, thereby leaving only approximately 90° of the completed cylindrical body connected to the ring 75. In actual fact, the length of the one-piece connection between the ring 75 and the remainder of the body 60 is greater since there is an overlapped portion 73 thereof, see FIG. 10. The overlapped portion 73 provides a double thickness of sheet or spring metal which becomes important in the design of the contoured slot 42.

Referring now to the drawings and particularly to FIGS. 8 and 11 through 13 thereof, the movement-limiting slot 42 includes three positions for the associated loadlock 44, these being the loading position 77 and the shipping position 83 and the locking position 87. The loading position includes a part circular edge surface 78 having a single radius, the center being designated by reference numeral 79. The shipping position 83 is defined by two part circular and opposed edges 84 each having a single common radius with the center being designated by the reference numeral 85. The shipping position 83 and the loading position 77 are interconnected by opposed straight edges 82. Finally, the locking position 87 is defined by a pair of opposed part circular edges 91 having a first radius of curvature interconnected by a part circular edge 93 having a second radius of curvature, each having a common center designated 95. The locking position 87 is interconnected to the shipping position 83 by opposed straight edges 88 which have a greater longitudinal extent than the opposed straight edges 82 and are spaced apart a distance less than the distance between the opposed edges 82.

The three position, contoured movement-limiting slot 42 has been specifically designed to prevent manual as well as accidental movement of the loadlock 44 from the locked position 87 to either the shipping position 83 or the loading position 77. The opposed straight edges 82 interconnecting the loading position 77 and the shipping position 83 are spaced apart a distance equal to the outside diameter of the projections 76 extending from the cylindrical body 60 of the loadlock 44. The distance between the opposed straight edges 88 interconnecting the shipping positions 83 and the locking position 87 is less than the distance between the opposed edges 82 and is dimensioned to be slightly less than the outside diameter of the projections 76, thereby to prevent manual or inadvertent movement of the loadlock 44 between the shipping position 83 and locking position 87.

The opposed edges 88 are closer together in the present invention than in the slot disclosed in the prior named McConnell et al, patent which had limitations previously discussed. For these reasons, the loadlock 44 disclosed in the McConnell et al, patent has been modified to provide greater resilience to the ring 75 by providing the aforementioned extended slit 71 of about 270° of arc. This added resilience to the ring 75 allows the projections 76 to be resiliently deformed inwardly without permanent deformation during the passage of the loadlock 44 between the shipping position 83 and the locking position 87, which is required to prevent turning of the retainer 48 about the handle 58.

The loadlock 42 can be moved between the aforementioned shipping position 83 and the locking position 87 only by the use of a tool such as a hammer, and therefore, inadvertent manual movement of the loadlock 44 out of the locking position 87 is substantially impossible for a normal person. The locking position 87 is defined by the opposed part circular edge surfaces 91 having a first radius and dimensioned to accommodate the projections 76 therein at their fully extend or normal position and a part circular surface 93 having a second radius dimensioned to accommodate the overlapping portion 73 of the cylindrical body 60. These two radii of curvature are necessary to accommodate the loadlock 44 in the locking position 87 such that the loadlock 44 is entirely clear of the opposed straight surfaces 88. Because the opposed straight surfaces 88 in the present invention provide a function not available in the prior McConnell et al, patent, the longitudinal extent of these surfaces has been expanded such that the surfaces 88 are longer than the surfaces 82 to provide expanded bearing surfaces which do not unduly wear during several movements of the loadlocks 44 between the shipping position 83 and the locking position 87.

In a dimensional example of the present invention, the three position movement-limiting slot 42 has the loading position 77 thereof defined by a part circular surface 78 having a diameter of about 0.530 inches. The opposed straight surfaces 82 are about 0.485 inches apart. The shipping position is defined by the opposed part circular edge surfaces 84 having a diameter of about 0.530 inches. The locking position 87 is defined by a pair of opposed part circular edge surfaces 91 having a diameter of about 0.530 inches interconnected by a part circular arcuate edge 93 having a radius of 0.253 inches. The distance between the center 79 of the loading position 77 and the center 85 of the shipping position 83 is about 0.250 inches, whereas the distance between the center 85 of the shipping position 83 and the center 95 of the locking position 87 is approximately 0.297 inches, thereby illustrating the longer dimension for the opposed surfaces 88 than for the opposed surfaces 82. The opposed surfaces 88 are dimensioned approximately 0.465 inches apart whereas the opposed surfaces 82 are dimensioned approximately 0.85 inches apart thereby illustrating the positive bearing feature of the opposed surfaces 88. All measurements are within plus or minus 0.005 inches.

The foregoing specific dimensions of the movement-limiting slot 42 are relevant only with a loadlock 44 dimensioned normally to bear against the opposed surfaces 82 and having the capacity to be compressed when passing between the opposed surfaces 88 without turning around the handle 58. The normal expanded position of the projections 76 of the loadlock 44 prevent its manual movement between the opposed surfaces 88 thereby providing the positive locking capabilities of the loadlock 44 and movement limiting slot 42 of the present invention. The extended slit 71 between the ring 75 and the remainder of the cylindrical body 60 provide the required resiliency to accommodate movement through the restricted area between the opposed surfaces 88.

There has been described what at present is considered to be the preferred embodiment of the present invention; however, it will be appreciated that various modifications and alterations may be made therein without departing from the true spirit and scope of the present invention and all such modifications and alterations are intended to be covered in appended claims.

What is claimed is:

1. A beam for use in a supporting structure comprising in combination, an elongated body portion having at one end an end flange with a hole therein, a load lock having a bolt with a shank aligned with and slidable through said end flange hole, a contoured movement-limiting slot in said body portion, said slot having contoured edge surfaces defining a loading position and a shipping position and a locking position, said shipping position being intermediate said loading position and said locking position, the opposed edge surfaces between the shipping position and the locking position being straight and parallel and spaced sufficiently close to prevent movement of said bolt between said positions without the aid of a tool, a handle integral with said bolt shank and extending through said contoured slot and having an enlarged head on the free end thereof, retaining means on said handle for preventing withdrawal thereof from said slot during axial sliding movement of said handle in said slot among the three positions thereof, and resilient means on said handle slidably engaging the edge surfaces of said contoured slot to retain said handle in a selected one of said loading position and said shipping position and said locking position, whereby said shank end is variably positioned in the end flange hole.

2. The beam set forth in claim 1, wherein said shank has a tapered end which extends partly into the end flange hole when said handle is in the loading position of said slot.

3. The beam set forth in claim 1, wherein said shank has a tapered end which extends through and partly out of the end flange hole when said handle is in the shipping position of said slot.

4. An elongated beam for use in a support structure having at least a pair of end frames each having two uprights and a plurality of load locks for maintaining the beams connected to the associated end frame upright, said beam including a contoured movement-limiting slot in said beam, said slot having contoured edge surfaces defining a loading position and a shipping position and a locking position, said shipping position being intermediate said loading position and said locking position, the opposed edge surface between said shipping position and said locking position being straight and parallel and spaced sufficiently close to prevent movement of a load lock between said positions without the aid of a tool.

5. The beam set forth in claim 4, wherein each of said loading position and said shipping position and said locking position is separated by spaced apart straight edge surfaces.

6. The beam set forth in claim 4, wherein the contoured edge surfaces defining said shipping position and said loading position are part circular.

7. The beam set forth in claim 6, wherein the arcuate surfaces defining said shipping position and said loading position have the same radius of curvature.

8. A load lock for locking a beam having a slot therein to a frame having a hole therein, comprising a bolt having a shank with an end thereof adapted to slide through the hole in the frame, a handle integral with said bolt shank and having an enlarged head on the free end thereof, retaining means on said handle for preventing withdrawal thereof from the slotted beam during axial sliding movement of said handle in the slot, and resilient means encircling said handle for slidably engaging the edge surfaces of the beam slot to retain said handle in a selected portion of the slot, said retaining means and said resilient means being a one-piece cylindrical body connected only along about a 90° portion of the circumferential extent of said body.

9. The loadlock set forth in claim 8, including means on said handle between said shank and said enlarged head to resist turning movement of said resilient means.

10. The load lock set forth in claim 8, wherein said retaining means includes a pair of diametrically opposite tabs projecting outwardly from said handle and engageable with an adjacent surface of the beam.

11. In a support structure having at least a pair of end frames each having two uprights with vertically spaced holes therein and a plurality of elongated beams each having a contoured movement-limiting slot therein with contoured edge surfaces and an end flange with a hole therein interconnecting the end frames and a plurality of load locks each having a bolt with a shank aligned with and slidable through the associated end flange hole and a handle extending through an associated beam slot with an enlarged head on the free end thereof for maintaining the beams connected to the end frames, the improvement comprising each of said movement-limiting slots having the contoured edge surfaces thereof defining a loading position and a shipping position and a locking position, said shipping position being intermediate said loading position and said locking position, and a one-piece resilient retainer means on each of the handles for preventing withdrawal thereof from the associated slot after insertion thereinto and for engaging the edge surfaces of said associated slot to retain the handle in a selected one of said loading position and said shipping position and said locking position, the opposed edges between the shipping position and the locking position being straight and spaced apart a distance slightly less than the normal outside diameter of said one-piece resilient retainer means so as to prevent movement of said bolt between the shipping and locking positions without the aid of a tool.

12. The device of claim 11, wherein the free end of the shank extends partly into the end flange hole when the handle is in the loading position of said slot.

13. The device of claim 11, wherein the free end of the shank extends through the end flange hole and at least partly into an aligned hole in the end frame upright when the handle is in the shipping position of said slot.

14. The device of claim 11, wherein the free end of the shank extends through the end flange hole and through an aligned hole in the end frame upright when the handle is in the locking position of said slot.

15. An elongated beam for use in a support structure having at least a pair of end frames each having two uprights and a plurality of load locks for maintaining the beams connected to the associated end frame upright, said beam including a contoured movement-limiting slot in said beam, said slot having contoured edge surfaces defining a loading position and a shipping position and a locking position, said shipping position being intermediate said loading position and said locking position, each of said loading position and said shipping position and said locking position being separated by opposed straight edge surfaces, the edge surfaces between said shipping position and said locking position having a greater longitudinal extent than the edge surfaces between said loading position and said shipping position, and the opposed edge surface between said shipping position and said locking position being sufficiently close to prevent movement of a load lock between said positions without the aid of a tool.

16. An elongated beam for use in a support structure having at least a pair of end frames each having two uprights and a plurality of load locks for maintaining the beams connected to the associated end frame upright, said beam including a contoured movement-limiting slot in said beam, said slot having contoured edge surfaces defining a loading position and a shipping position and a locking position, said shipping position being intermediate said loading position and said locking position, the opposed edge surface between said shipping position and said locking position being sufficiently close to prevent movement of a load lock between said positions without the aid of a tool, the edge surfaces defining said locking position comprising diametrically opposed part circular edge surfaces having a first radii and a part circular edge surface connecting said opposed surfaces having a second radii.

17. A load lock for locking a beam having a slot therein to a frame having a hole therein, comprising a bolt having a shank with an end thereof adapted to slide through the hole in the frame, a handle integral with said bolt shank and having an enlarged head on the free end thereof, retaining means on said handle for preventing withdrawal thereof from the slotted beam during axial sliding movement of said handle in the slot, retaining means including a pair of diametrically opposite tabs projecting outwardly from said handle and engageable with an adjacent surface of the associated beam, and resilient means encircling said handle for slidably engaging the edge surfaces of the beam slot to retain said handle in a selected portion of the slot, said resilient means including a pair of diametrically opposite projections outstanding from said handle between said tabs and said enlarged head and engageable with the edge surfaces of the associated slot to retain said shank in a longitudinal adjusted position in the associated slot, said resilient means being connected to said retaining means along only a minor portion of the circumferential extent of said resilient means.

18. In a support structure having at least a pair of end frames each having two uprights with vertically spaced holes therein and a plurality of elongated beams each having a contoured movement-limiting slot therein with contoured edge surfaces and an end flange with a hole therein interconnecting the end frames and a plurality of load locks each having a bolt with a shank aligned with and slidable through the associated end flange hole and a handle extending through an associated beam slot with an enlarged head on the free end thereof for maintaining the beams connected to the end frames, the improvement comprising each of said movement-limiting slots having the contoured edge surfaces thereof defining a loading position and a shipping position and a locking position, said shipping position being intermediate said loading position and said locking position, the opposed edge surfaces between the shipping position and the locking position being sufficiently close to prevent movement of said bolt between said positions without the aid of a tool, and a one-piece resilient retainer means on each of the handles for preventing withdrawal thereof from the associated slot after insertion thereinto and for engaging the edge surfaces of said associated slot to retain the handle in a selected one of said loading position and said shipping position and said locking position, the portion of said one-piece retainer means engaging the edge surfaces of said slot being diametrically opposed projections extending from a ring encircling the handle and connected to the remainder of said retainer means along a portion thereof having an arcuate extent of about 90°.

* * * * *